United States Patent Office 3,287,417
Patented Nov. 22, 1966

3,287,417
BIS-(SUBSTITUTED THIOL)DICHLOROMETHANES
Harry Bender, El Cerrito, and Harold M. Pitt, Lafayette, Calif., assignors to Stauffer Chemical Company, New York, N.Y., a corporation of Delaware
No Drawing. Filed Nov. 6, 1963, Ser. No. 321,693
6 Claims. (Cl. 260—609)

This invention relates to a new and useful group of sulfur containing compounds. Specifically, these new compounds are bis-(substituted thiol)dichloromethanes.

These new compounds correspond to the general formula $$R-S-CCl_2-S-R'$$

wherein R is selected from the group consisting of alkyl, cycloalkyl, chloroalkyl and chloroalkenyl, and R' is selected from the group consisting of chloroalkyl, chloroalkenyl, cyclochloroalkyl and arylchloroalkyl, said compounds containing a total of about 5 to about 11 carbon atoms, inclusive.

These compounds are useful intermediates in the preparation of a wide variety of materials such as rubber accelerators, flotation agents, dye intermediates, pharmaceuticals, lubricant additives, and as agents for improving water repellency of cellulosic products.

Generally the compounds of this invention can be readily prepared by the reaction of substituted-thiodichloromethane sulfenyl chlorides with an alkene or alkyne. Trace amounts of anhydrous aluminum chloride were used as a catalyst in some cases to decrease the reaction time. Other Lewis acid type catalysts could be used—the choice here was one of convenience.

Preparation of the substituted-thiodichloromethane sulfenyl chloride may be carried out by reacting an alkane, alkene or alkyne with chlorine gas and carbon disulfide in the presence of a free radical initiator. The method herein indicated is described in detail in our copending application Serial No. 321,664 filed on even date herewith.

The following examples illustrate the preparation of the novel compounds of this invention.

Example 1

Into a portion of 1,2,2-trichloroethylthiodichloromethane sulfenyl chloride was bubbled ethylene gas. The sulfenyl chloride was kept saturated with ethylene gas until no more was absorbed. At that time nearly a quantitative yield of 1,2,2-trichloroethylthio-2'-chloroethylthiodichloromethane ($CHCl_2CHClSCCl_2SCH_2CH_2Cl$) was found. This was confirmed by infrared analysis.

Example 2

To 1 mole of 1,2,2-trichloroethylthiodichloromethane sulfenyl chloride was added 1 mole of butadiene. Only a 1–1 adduct was formed even when an excess of the sulfenyl chloride was used. Infrared identification showed the compound to be 1,2,2-trichloroethylthio-4'-chloro-Δ²-butenylthiodichloromethane $$(CHCl_2CHClSCCl_2SCH_2CH=CHCH_2Cl)$$

The molecular weight as found by benezene freezing point depression was 369; calculated 369.

Analysis.—Calculated for $C_7H_8Cl_6S_2$: C, 22.50; H, 2.20; Cl, 57.70; S, 16.60. Found: C, 22.52; H, 2.37; Cl, 57.55; S. 16.6.

Example 3

To a 50% (v./v.) solution of 1,2,2-trichloroethylthiodichloromethane sulfenyl chloride in carbon disulfide was added styrene. The addition was portionwise with external cooling to keep the temperature of the reaction flask at 30° C. A 25% excess of styrene was used. After the reaction was complete the material was crystallized. The compound was recrystallized from hexane. The crystals had a melting point of 61–63° C. Infrared examination showed the compound to be 1,2,2-trichloroethylthio-2'-chlorostyrylthiodichloromethane $$(CHCl_2CHClSCCl_2SCH_2CHClC_6H_5)$$

Analysis for $C_{11}H_{10}Cl_6S_2$.—Calculated: C, 29.65; H, 2.45; Cl, 52.20; S, 15.65. Found: C, 31.3; H, 2.50; Cl, 51.25; S, 15.3.

Example 4

To a portion of 1,2,2-trichloroethylthiodichloromethane sulfenyl chloride was added 3-chloro-propene-1. No catalyst was used. Heat was evolved from the reaction. After the reaction was completed, infrared analysis showed the compound produced to be 1,2,2-trichloroethyl-thio-2',3'-dichloropropylthiodichloromethane $$(CHCl_2CHClSCCl_2SCH_2CHClCH_2Cl)$$

Example 5

To 155 g. of 1,2,2-trichloroethylthiodichloromethane sulfenyl chloride was added an excess of cyclohexene. No catalyst was present. The reactants were mixed for several hours. Infrared analysis showed the compound produced to be 1,2,2-trichloroethylthio-2'-cyclohexylthiodichloromethane ($CHCl_2CHClSCCl_2SC_6H_{10}Cl$).

Example 6

The reaction between 1,2,2-trichloroethylthiodichloromethane sulfenyl chloride and acetylene was carried out. To accomplish this, the sulfenyl chloride was kept saturated with acetylene for five days with a trace of anhydrous aluminum chloride as a catalyst. At the end of this time the reaction was 70% complete (by infrared analysis). The main fraction was identified by its vinyl group on distillation in the molecular still. The compound formed was 1,2,2-trichloroethylthio-2'-chlorovinylthiodichloromethane ($CHCl_2CHClSCCl_2SCH=CHCl$).

Analysis for $C_5H_4Cl_6S_2$.—Calculated: C, 17.60; H, 1.17; Cl, 63.10; S, 18.75. Found: C, 17.3; H, 1.5; Cl, 63.1; S, 19.0. Molecular weight: calculated 341, found 342.

Example 7

To 41 ml. (63 g.) of 2-chloromethylthiodichloromethane sulfenyl chloride was added 60 ml. of 3-choloropropene-1. A small amount of anhydrous aluminum chloride was added. The reaction mixture was subjected to ultraviolet irradiation. At the end of the reaction time the compound formed was found by infrared anlaysis to be 2 - chloroethylthio - 2',3'-dichloropropylthiodichloromethane ($CH_2ClCH_2SCCl_2SCH_2CHClCH_2Cl$).

Example 8

To 40 ml. (55.7 g.) of cyclohexylthiodichloromethane sulfenyl chloride was added 60 ml. of 3-chloro-propene-1. The reaction mixture was irradiated by ultraviolet light for 16 hours. At the end of that time infrared analysis showed the compound formed to be cyclohexylthio-2'3'-dichloropropylthiodichloromethane $$(C_6H_{11}SCCl_2SCH_2CHClCH_2Cl)$$

Analysis for $C_{10}H_{16}Cl_4S_2$.—Calculated: C, 39.10; H, 5.20; Cl, 34.70. Found: C, 40.19; H, 5.8; Cl, 34.2.

Various changes and modifications may be made in the process and compositions described herein as will be apparent to those skilled in the chemical arts. It is accordingly intended that the present invention shall only be limited by the scope of the appended claims.

We claim:
1. Bis-(substituted thiol)dichloromethanes corresponding to the formula R—S—CCl$_2$—S—R' wherein R is selected from the group consisting of alkyl, cycloalkyl, chloroalkyl and chloroalkenyl, and R' is selected from the group consisting of chloroalkyl, chloroalkenyl, cyclochloroalkyl and phenylchloroalkyl, said dichloromethanes containing a total of about 5 to about 11 carbon atoms, inclusive.
2. The compound 2-chloroethylthio-2',2'-dichloropropylthiodichloromethane.
3. The compound 1,2,2-trichloroethylthio-4'-chloro-Δ$^2$-butenylthiodichloromethane.
4. The compound 1,2,2-trichloroethylthio-2'-chlorostyrylthiodichloromethane.
5. The compound 1,2,2-trichloroethylthio-2'-chlorovinylthiodichloromethane.
6. The compound cyclohexylthio-2'3'-dichloropropylthiodichloromethane.

No references cited.

CHARLES B. PARKER, *Primary Examiner.*

D. R. PHILLIPS, *Assistant Examiner.*